United States Patent
Prickler et al.

[11] Patent Number: 5,813,789
[45] Date of Patent: Sep. 29, 1998

[54] BALL-AND-SOCKET JOINT

[75] Inventors: Wolfgang Prickler, Kaarst; Matthias Kaussen, Essen; Christian Wutzler, Kaarst, all of Germany

[73] Assignee: TRW Fahrwerksysteme GmbH & Co. KG, Dusseldorf, Germany

[21] Appl. No.: 756,343

[22] Filed: Nov. 26, 1996

[30] Foreign Application Priority Data

Dec. 7, 1995 [DE] Germany ............ 195 45 567.3

[51] Int. Cl.$^6$ .................................... F16C 11/06
[52] U.S. Cl. .................. 403/135; 403/133; 403/140
[58] Field of Search ................... 403/114, 122, 403/135, 141, 143, 142, 140, 133, 139, 137, 127

[56] References Cited

U.S. PATENT DOCUMENTS

| | | | |
|---|---|---|---|
| 3,004,786 | 10/1961 | Herbenar ............................ | 403/140 |
| 3,787,127 | 1/1974 | Cutler ................................ | 403/133 |
| 4,318,627 | 3/1982 | Morin ................................ | 403/133 |
| 4,360,284 | 11/1982 | Brandenburg ...................... | 403/142 X |
| 4,537,524 | 8/1985 | Hanson ............................. | 403/135 X |
| 4,571,110 | 2/1986 | Amrath .............................. | 403/141 |
| 4,619,658 | 10/1986 | Pappas et al. . | |
| 4,624,674 | 11/1986 | Pappas et al. . | |
| 4,701,064 | 10/1987 | Mizusawa .......................... | 403/141 X |
| 4,714,477 | 12/1987 | Fichera et al. .................... | 403/135 X |
| 5,143,469 | 9/1992 | Cabeddu ........................... | 403/140 X |
| 5,630,672 | 5/1997 | McHale ............................. | 403/140 X |
| 5,704,727 | 1/1998 | Atkins et al. ...................... | 403/135 |

FOREIGN PATENT DOCUMENTS

| | | | |
|---|---|---|---|
| 0020214 | 12/1980 | European Pat. Off. . | |
| 1215375 | 4/1960 | France . | |
| 2378197 | 9/1978 | France .............................. | 403/122 |
| 2449819 | 9/1980 | France . | |
| 2449819 | 10/1980 | France .............................. | 403/133 |
| 2522090 | 8/1983 | France . | |
| 3602261 | 7/1987 | Germany . | |
| 143221 | 7/1985 | Japan ................................ | 403/140 |
| 3-199707 | 8/1991 | Japan ................................ | 403/135 |
| 2106173 | 4/1983 | United Kingdom ................ | 403/122 |

*Primary Examiner*—Harry C. Kim
*Attorney, Agent, or Firm*—Tarolli, Sundheim, Covell, Tummino & Szabo

[57] ABSTRACT

The invention pertains to a ball-and-socket joint composed of a ball pivot (1) and a joint housing (3), in which the coupling ball (1*a*), is supported, such that it can be twisted and tilted to a limited extent, by a plastic bearing shell (2). The bearing shell (2) supports the coupling ball (1*a*) both above and below the equator (1*b*) of the ball, at least in the region of a bearing surface (2*a'*,2*c'*) in the form of an annular segment of a sphere. In order to create a mountable ball-and-socket joint, which guarantees the creation and retention of defined joint characteristics over the entire service life of the joint, at least the part of the bearing shell (2) supporting the surface of the coupling ball (1*a*) lying below the equator (1*b*) of the ball is divided into at least two sections (2*a*), each hinge delimited by a film hinge (2*b*), which together form a bearing surface (2*a'*) in the form of an annular segment of a sphere.

5 Claims, 2 Drawing Sheets

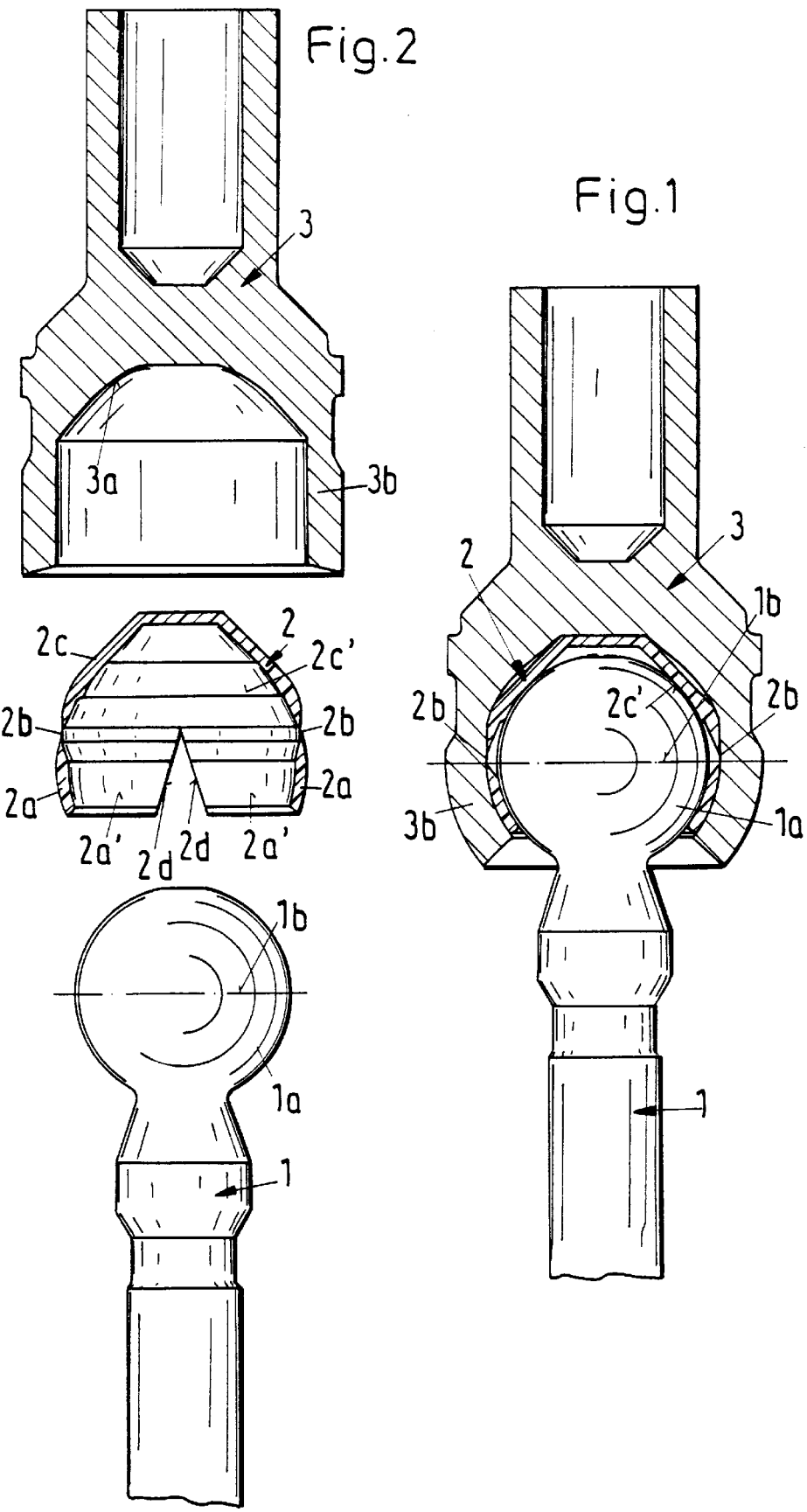

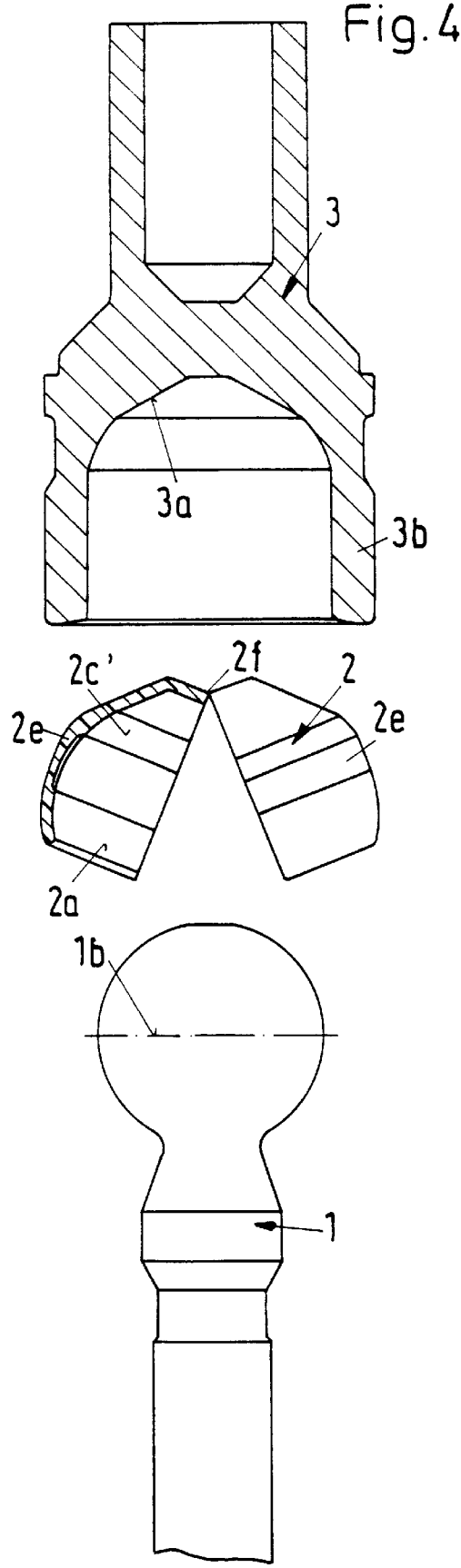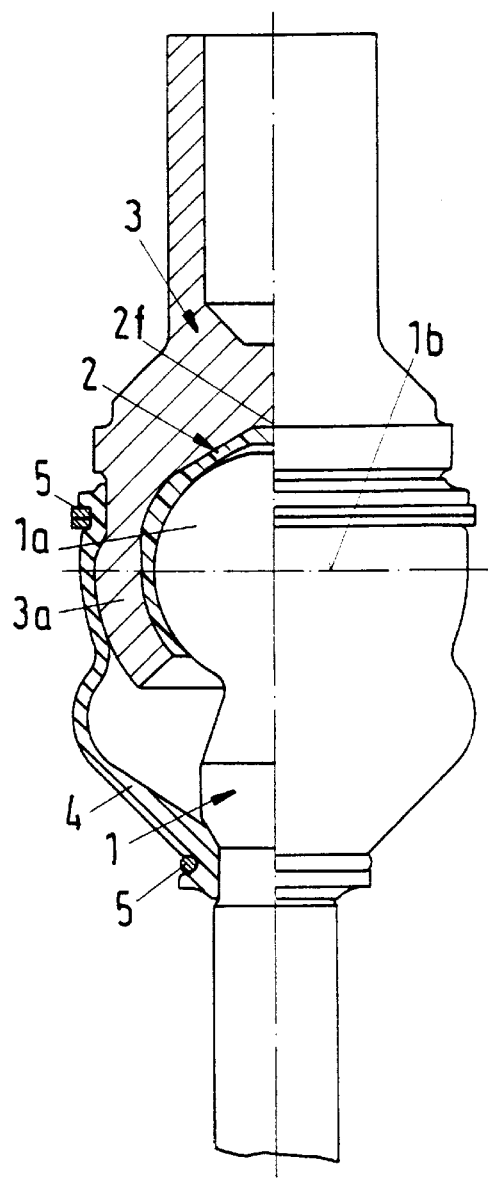

BALL-AND-SOCKET JOINT

BACKGROUND OF THE INVENTION

The invention concerns a ball-and-socket joint composed of a ball pivot and a joint housing, in which a coupling ball is supported such that it can be twisted and tilted to a limited extent, by means of a plastic bearing shell which supports the coupling ball both above and below the equator of the ball, at least in the area of the bearing surface in the shape of an annular segment of a sphere.

Ball-and-socket joints of this type are known. Their bearing shell is produced as a single plastic piece, with a cylindrical part connected with the part of the bearing shell supporting the surface of the coupling ball lying above the equator of the ball, which, during assembly of the ball-and-socket joint, makes possible penetration of the coupling ball and which, after the insertion of the coupling ball provided with a bearing shell in the opening of the joint housing, is reshaped into the form of annular segment of a sphere by means of deformation of the joint housing edges so that the surface of the coupling ball lying below the equator of the ball is supported in the bearing shell and, in this manner, the coupling ball is prevented from coming out of the joint housing.

Producing a bearing shell which has a cylindrical part which is forcibly deformed the annular segment of a sphere during assembly produces undefined local internal stress in the bearing shell by means of the material surplus connected with this, since the final form of the annular segment of a sphere has a smaller surface than the cylindrical form of the starting state. This results in localized increased pressing conditions between the plastic of the bearing shell and the adjacent steel parts of the coupling ball and of the joint housing, which is connected with the danger of deficient lubrication and the existence of a stick-slip effect. In addition, undesired changes in the properties of the joint can occur over time, since the internal stress conditions induced in the bearing shell during the assembly process decay in the course of the life of the joint by means of an uncontrolled relaxing of the plastic. In order to bring about properties of the joint which are defined and remain the same over the life of the joint, it is frequently necessary, for known ball-and-socket joints, to thermally postprocess the joints for decay of internal stresses brought about by means of the bearing shell.

The invention is based on the problem of creating a ball-and-socket joint of the initially defined type which also guarantees the creation and retention of defined properties of the joint over the entire life of the joint without thermal postprocessing.

SUMMARY OF THE INVENTION

The solution to this problem formulation by means of the invention is characterized in that at least the part of the bearing shell supporting the surface of the ball-and-socket joint lying below the equator of the ball, divided into at least two sections, together forming a bearing surface in the form of an annular segment of a sphere, which is hinge delimited by means of a film hinge, for penetration of the coupling ball.

With the proposal in accordance with the invention, it is possible to produce a bearing shell consisting of plastic with the form of a built-in state even while carrying out the manufacturing of same, preferably by means of injection molding. At least the part of the bearing shell supporting the surface of the coupling ball lying below the equator of the ball is divided, in accordance with the invention, into at least two sections, together forming a bearing surface in the form of an annular segment of a sphere, which is hinge delimited by means of a film hinge, for penetration of the coupling ball. This avoids the deformation of the plastic shell, leading to undefined internal stresses in the same, and the disadvantages, explained above, resulting from this. The sections, already manufactured in the shape of their later built-in state, serving together to form a bearing surface in the form of an annular segment of a sphere for the support of the surface of the coupling ball lying below the equator of the ball, are hinge delimited merely in the area of their film hinge when the bearing shell is put on the bearing ball. Thermal post-processing of the mounted ball-and-socket joint is therefore unnecessary.

Apart from the possibility of dividing the part of the bearing shell supporting the surface of the coupling ball lying below the equator of the ball into at least two sections which are each connected with the remaining part of the bearing shell, hinge delimited by means of a film hinge, the possibility exists in accordance with an additional characteristic of the invention of dividing the bearing shell into two sections, each forming half of the bearing shell, which are connected directly to each other in the region by means of a film hinge running at a right angle to the joint axis.

This configuration of the invention results in merely one short film hinge, the movement of which is abolished in a built-in state.

Finally, the invention proposes to develop a bearing shell with its surface area, at least in the areas adjoining the film hinge, fitting tightly in a positive-locking manner to the joint housing. This guarantees that the function of the film hinge in the built-in state is abolished and the bearing shell brings about a defined support of the coupling ball, both at the surface lying above the equator and below the equator, at least in the region of a bearing surface in the form of an annular segment of a sphere.

BRIEF DESCRIPTION OF THE DRAWINGS

Two embodiment examples of a ball-and-socket joint in accordance with the invention are represented in the figure, and shown are:

FIG. 1, a longitudinal section through a first embodiment of a ball-and-socket joint, FIG. 2, a sectional representation corresponding to FIG. 1, of the individual parts of the ball-and-socket joint before their assembly, FIG. 3, a longitudinal section through a second embodiment, and FIG. 4, a sectional representation in accordance with FIG. 3 of the individual parts of the ball-and-socket joint, before their assembly.

DETAILED DESCRIPTION OF PREFERRED EMBODIMENTS

In both embodiments, a ball-and-socket joint comprises a ball pivot (1), preferably produced of steel, one end of which is shaped into a coupling ball (1*a*). The equator (1*b*) of the ball of the coupling ball (1*a*) is indicated in the figures by means of a dot-dash line.

The coupling ball (1*a*) of a ball pivot (1) is supported, by means of a plastic bearing shell (2), so that it can be, twisted and tilted to a limited extent in a joint housing (3), which is formed with a recess (3*a*) for the insertion of the bearing shell (2) and a coupling ball (1*a*) arranged in the latter, as revealed, in particular, in FIGS. 2 and 4. The edge region (3b) of the joint housing (3), enclosing the part of the coupling ball (1a) lying below the equator (1b) of the ball, is cylindrically shaped in the starting state which, in turn, is revealed in FIGS. 2 and 4. This edge region (3b) is plastically deformed after insertion of a coupling ball (1a) provided with a bearing shell (2), and, in fact, by means of a female mold, which bestows upon the edge region (3b) the recognizable definitive form of the joint housing (3) in FIGS. 1 and 3. In this final state, the part of the bearing shell (2) supporting the surface of the coupling ball (1a) lying below the equator (1b) of the ball also supports a surface in the form of an annular segment of a sphere in the recess (3a) of the joint housing (3).

In order to produce a bearing shell (2)—preferably by means of injection molding—already in the form of the later built-in state during manufacturing, at least the part of the bearing shell (2) supporting the surface of the coupling ball (1a) lying below the equator (1b) of the ball is divided into at least two sections (2a), which are each hinge delimited by means of a film hinge (2b). Regarding this formation, the two embodiment examples differ according to FIGS. 1 and 2 or FIGS. 3 and 4.

In the first embodiment example in accordance with FIGS. 1 and 2, a bearing shell (2) consists of an upper part (2c), which forms a bearing surface in the form of an annular segment of a sphere (2c') for the support of the surface of a coupling ball (1a) lying above the equator (1b) of the ball. In the embodiment example, two sections (2a) are formed in the upper part (2c), by means of, in each case, one film hinge (2b), which are separated from each other by means of slots running axially (2d). During production, these sections (2a) already have in their starting state the form of a spherical section; and, in a mounted state, form a bearing surface (2a') in the form of an annular segment of a sphere for the surface of the coupling ball (1a) lying below the equator (1b) of the ball.

In the second embodiment in accordance with FIGS. 3 and 4, the bearing shell (2) is divided into two sections, each forming one bearing shell half (2e), that are directly connected to each other by means of a film hinge (2f) running at a right angle to the longitudinal axis of the ball-and-socket joint. In this embodiment also, a bearing shell (2) is produced in the form of the built-in state during production. Each bearing shell half (2e) is formed with a bearing surface (2c') in the form of an annular segment of a sphere supporting the surface of the coupling ball (1a) lying above the equator (1b) of the ball and with a bearing surface (2a') in the form of an annular segment of a sphere supporting the surface of the coupling ball (1a) lying below the equator (1b) of the ball, as clearly revealed in FIG. 4.

In both embodiments, a bearing shell (2) is put on a coupling ball (1a) of a ball pivot (1) by means of a delimited hinging of the sections (2a) or of the bearing shell halves (2e), before the coupling ball (1a), with bearing shell (2) put in place is inserted in the recess (3a) of the joint housing (3), of which the edge region (3b) is subsequently converted from the starting shape represented in FIGS. 2 and 4 into the definitive form according to FIGS. 1 and 3.

As revealed in FIGS. 1 and 3, the surface area of the bearing shell (2), at least in the regions adjoining a film hinge (2b;2f), is tightly fitted in a positive-locking manner in the recess (3a) of the joint housing (3) so that, in the final mounted state, the function of the film hinge (2b;2f) is abolished and the bearing shell (2) supports the coupling ball (1a) with defined joint properties.

In the embodiment example according to FIG. 3, a joint boot (4) is represented for completeness, with its housing side opening fastened to the joint housing (3), and with its spindle side opening fastened to the ball pivot (1), each, by means of a retainer (5); and the entrance of impurities into the joint as well as the escape of any used lubricating agent is prevented.

DRAWING REFERENCE LIST

1 Ball pivot
1a Coupling ball
1b Equator of the ball
2 Bearing shell
2a Section
2b Film hinge
2c Upper part
2d Slot
2e Bearing shell half
2f Film hinge
2a' Bearing surface
2c' Bearing surface
3 Joint housing
3a Recess
3b Edge region
4 Joint boot
5 Retainer Having described the invention, the following is claimed:

1. A ball and socket joint comprising:

a ball stud having a stud portion centered on a ball stud axis and a coupling ball at one end of said stud portion, said coupling ball having a center on said ball stud axis and an equator extending around said coupling ball at said center of said coupling ball and extending around said ball stud axis, said equator lying in a plane which is perpendicular to said ball stud axis and which contains said center of said coupling ball;

a joint housing having a chamber in which said coupling ball is located; and a plastic bearing shell in said chamber in said joint housing for supporting said ball stud for pivotal movement relative to said joint housing, said joint housing including an end portion defining an opening into said joint housing through which said stud portion of said ball stud extends, said end portion of said joint housing having a crimpable portion which is crimped into contact with said plastic bearing shell, said plastic bearing shell having a first portion located on one side of said equator of said coupling ball and engaging said coupling ball on one side of said equator, said plastic bearing shell having a second portion located on the other side of said equator for engaging said coupling ball on said other side of said equator, said first portion of said plastic bearing shell comprising at least two sections which are hinged to one other for pivotal movement about a transverse axis extending transverse to said ball stud axis, and said second portion of said plastic bearing shell comprising at least two sections which are pivotally movable about said transverse axis and which move toward one another into engagement with said coupling ball when said crimpable portion of said joint housing is crimped.

2. The ball and socket joint of claim 1 wherein one of said at least two sections of said first portion of said plastic bearing shell is formed in one piece with one of said at least two sections of said second portion as a first half of said bearing shell, another of said at least two sections of said first portion being formed in one piece with another of said at least two sections of said second portion as a second half of said plastic bearing shell.

3. The ball and socket joint of claim 1 wherein one of said at least two sections of said second portion of said plastic bearing shell pivots about said transverse axis in an inward direction toward said ball stud axis.

4. The ball and socket joint of claim 1 wherein said at least two sections of said second portion of said plastic bearing shell comprise first and second sections that pivot in opposite directions toward one another about said transverse axis.

5. The ball and socket joint of claim 1 wherein said transverse axis extends through said ball stud axis.

* * * * *